United States Patent
Eedarapalli

(10) Patent No.: US 12,184,699 B2
(45) Date of Patent: Dec. 31, 2024

(54) METHOD AND A SYSTEM FOR PROVIDING SECURITY AND ACCESS CONTROL IN A NETWORK MODEL

(71) Applicant: Prama, Inc., Louisville, KY (US)

(72) Inventor: Srinivasa Raju Eedarapalli, Louisville, KY (US)

(73) Assignee: Prama, Inc.

( * ) Notice: Subject to any disclaimer, the term of this patent is extended or adjusted under 35 U.S.C. 154(b) by 0 days.

(21) Appl. No.: 17/479,282

(22) Filed: Sep. 20, 2021

(65) Prior Publication Data
US 2022/0094715 A1  Mar. 24, 2022

Related U.S. Application Data

(60) Provisional application No. 63/080,298, filed on Sep. 18, 2020.

(51) Int. Cl.
*H04L 9/40* (2022.01)
(52) U.S. Cl.
CPC ............ *H04L 63/20* (2013.01); *H04L 63/102* (2013.01)
(58) Field of Classification Search
CPC ........ H04L 63/20; H04L 63/102; H04L 63/10
See application file for complete search history.

(56) References Cited

U.S. PATENT DOCUMENTS

| | | | | |
|---|---|---|---|---|
| 5,911,143 A * | 6/1999 | Deinhart | ............... | G06F 21/604 707/999.009 |
| 6,965,903 B1 * | 11/2005 | Agarwal | ............... | G06F 16/284 707/999.102 |
| 7,096,502 B1 * | 8/2006 | Fox | ..................... | H04L 63/1433 709/224 |
| 7,373,338 B2 * | 5/2008 | Thompson | .......... | G06F 21/6227 707/999.005 |
| 7,865,959 B1 * | 1/2011 | Lewis | ................. | G06F 21/6218 726/17 |

(Continued)

FOREIGN PATENT DOCUMENTS

WO   WO-2010000738 A1 *   1/2010   ........... H04L 41/082

OTHER PUBLICATIONS

Li et al., "Access control model based on multi-role and task", 2011, IEEE. pp. 2756-2759. (Year: 2011).*

(Continued)

*Primary Examiner* — Matthew Smithers
(74) *Attorney, Agent, or Firm* — Kendal M. Sheets

(57) ABSTRACT

The invention relates to method and system for providing security and access control in a network model. The method includes generating a network model including process entities. Each of the process entities is represented by a corresponding node on a node-based User-Interface. Each of nodes corresponding to the entities is configured to be linked with at least one of remaining nodes of the nodes in the node-based User-Interface, via an interconnection network link. The method further includes receiving one or more attributes associated with each of the nodes; and creating an access control policy for a target node of the nodes. Accessing the target node includes at least one of view the attributes associated with the target node; modifying the attributes associated with the target node; or modifying an interconnection network link between the target node and another node of the nodes.

20 Claims, 5 Drawing Sheets

(56) References Cited

U.S. PATENT DOCUMENTS

| | | | | |
|---|---|---|---|---|
| 10,044,722 | B2* | 8/2018 | El Khoury | G06F 21/604 |
| 10,417,586 | B2* | 9/2019 | Mattox | G06F 16/40 |
| 10,574,701 | B1* | 2/2020 | Averi | G06F 9/45558 |
| 10,972,508 | B1* | 4/2021 | Dods | H04L 63/1433 |
| 11,762,920 | B2* | 9/2023 | van Rotterdam | G06Q 10/067 707/715 |
| 2003/0105978 | A1* | 6/2003 | Byrne | G06F 16/10 726/4 |
| 2005/0204402 | A1* | 9/2005 | Turley | H04L 63/0263 726/11 |
| 2005/0257244 | A1* | 11/2005 | Joly | G06F 21/604 726/1 |
| 2006/0053389 | A1* | 3/2006 | Michelman | G06N 3/004 715/779 |
| 2007/0214129 | A1* | 9/2007 | Ture | G06F 16/951 |
| 2008/0301754 | A1* | 12/2008 | Furuichi | G06F 21/62 726/1 |
| 2009/0063540 | A1* | 3/2009 | Mattox | G06F 16/40 707/999.102 |
| 2010/0158254 | A1* | 6/2010 | Schaad | G06F 21/6209 380/282 |
| 2010/0161371 | A1* | 6/2010 | Cantor | G06Q 10/06 706/47 |
| 2011/0145035 | A1* | 6/2011 | Franke | G06Q 10/067 705/348 |
| 2011/0219425 | A1* | 9/2011 | Xiong | G06F 21/6218 726/28 |
| 2012/0185791 | A1* | 7/2012 | Claussen | G06Q 10/063 715/772 |
| 2014/0075492 | A1* | 3/2014 | Kapadia | G06F 21/604 726/1 |
| 2015/0172320 | A1* | 6/2015 | Colombo | H04L 63/105 726/1 |
| 2018/0026834 | A1* | 1/2018 | Dec | H04L 41/40 709/221 |
| 2018/0309790 | A1* | 10/2018 | Johnson | H04L 63/20 |
| 2018/0367412 | A1* | 12/2018 | Sethi | H04L 43/20 |
| 2019/0089742 | A1* | 3/2019 | Hill | H04L 63/1433 |
| 2019/0205773 | A1* | 7/2019 | Ackerman | G06Q 10/067 |
| 2019/0278910 | A1* | 9/2019 | Zhang | G06F 21/606 |
| 2019/0319926 | A1* | 10/2019 | Cummins | H04L 41/02 |
| 2020/0053091 | A1* | 2/2020 | Childress | H04L 63/108 |
| 2020/0259864 | A1* | 8/2020 | Soffer | H04L 63/102 |
| 2020/0320481 | A1* | 10/2020 | Narayanan | G06F 9/541 |
| 2021/0049227 | A1* | 2/2021 | Clarke | G06F 3/0486 |
| 2021/0056224 | A1* | 2/2021 | Jaleel | G06F 16/2264 |
| 2021/0075795 | A1* | 3/2021 | Liu | H04L 63/083 |
| 2022/0004654 | A1* | 1/2022 | Patel | G06F 21/602 |

OTHER PUBLICATIONS

Fisler et al.; "Verification and Change-Impact Analysis of Access-Control Policies", 2005, ACM, pp. 196-205. (Year: 2005).*

Pan Jun Sun.; "Privacy Protection and Data Security in Cloud Computing: a Survey, Challenges, and Solutions", 2019, IEEE, pp. 147420-147452. (Year: 2019).*

Goldstein et al.; "Augmented Enterprise Models as a Foundation for Generating Security-Related Software: Requirements and Objectives", 2012, ACM, pp. 1-6. (Year: 2012).*

Chatterjee et al.; "Dynamic policy based model for trust based access control in P2P applications", 2009, IEEE, pp. 1-5. (Year: 2009).*

Demchenko et al.; "Policy Based Access Control in Dynamic Grid-based Collaborative Environment", 2006, IEEE, pp. 1-10. (Year: 2006).*

Mazzoleni et all.; "Efficient Integrationof Fine-grained Access Control in Large-scale Grid Services", 2005, IEEE, pp. 1-8. (Year: 2005).*

Ahmed et al.; "Static Verification of Security Requirements in Role Based CSCW Systems", 2003, IEEE, pp. 196-203. (Year: 2003).*

* cited by examiner

METHOD AND A SYSTEM FOR PROVIDING SECURITY AND ACCESS CONTROL IN A NETWORK MODEL

CROSS REFERENCE TO RELATED APPLICATIONS

The present application claims priority to U.S. Provisional Application No. 63/080,298 filed on Sep. 18, 2020 titled "SYSTEM AND METHOD FOR MODELLING AND DEFINING SECURITY AND ACCESS CONTROL POLICIES." This provisional patent application is incorporated by reference for all that is disclosed and taught therein.

TECHNICAL FIELD

Generally, the invention relates to software applications. More specifically, the invention relates to a method and a system for providing security and access control in a network model.

BACKGROUND

Conventional security methods include general authentication and authorization that is given at a very high level, for example, just at the entry level into a system or a software application, e.g. a web-based application. But, the system or the software application is typically comprised of more underlying components, such as screen flows supporting an execution of a task, screens that underpin them, Application Programming Interfaces (APIs) that integrate those screens to the databases and supporting applications/systems, database(s) with plurality of indexed rows and columns storing data. Each of the screens is communicating with the database via the APIs for fetching data and eventually to operate. In one general implementation, an access to all screens and all related database entities, in the entire system or application, is given to a user by macroscopically providing access of the system application, such as, to an end consumer for the entire application or the system on which the application is installed. Access control at such high levels may create problems.

Moreover, conventional access control layers in the software applications may also specifically grant access control to some of these individual screens and database's rows and columns which are related to these screens, based on the role of the user. Access control at such low levels may also create problems, such as controlling access to resources at the lowest level (Database Table, Row of Data, Screen, API etc.) This not only makes it difficult to implement security policies that model the real-world security needs of business, but also makes them brittle when it comes to changing them.

In today's evolutionary technology world, there are very frequent and regular changes within the architecture of the software applications. Providing access, for example, to the specific database table, row of data, graphical user screen, and API etc., may make it harder for the underlying security and access control layer when they need to stay consistent with new changes in the software application. For example, introducing a new step or a screen in the flow of screens that help perform a task in a web-based software application, may affect the already laid out security and access control policies. This is because the security and access control policies should be updated to include access to new screen and the APIs, Databases, Tables, Data Rows that underpin the newly added screen for each user who needs to be able to perform the task. It may be very cumbersome for a developer to update the security and access control policies needed to introduce frequent and regular changes in the software applications.

Thus, security and access control of existing systems is not appropriately grained. Further, granting access and security control based on a role-driven model may alone be not enough. For example, role driven models do not implement restriction rules when they are needed in some users' access. Most application security products are standalone systems, i.e., not integral part of a business system, and hence lack deep access into the business's information and complex relationships of its information model.

Standalone Security Products that implement Role Based Access Control (RBAC) are used to implement access controls at only resource level. Users in the RBAC system are added with the attributes to help define and restrict their access.

Further, in most of the current applications, the Application Security Products is generally created using a two-dimensional structure, such as using rows and tables, using excel spreadsheets, to interconnect user's attributes with a user based on his role in business organization. Such two dimensional models, with multiple rows and columns, are complex structures which are hard to comprehend, may not be dynamic and flexible, when any changes within the security model may be required, or when any more attributes may need to be added or deleted for new or old users in the business organization. Moreover, these two-dimensional models may not be executable.

Thus, there is a need to address the above problems in the existing systems for modeling and structuring the security and access control policies.

SUMMARY

In one embodiment, a method for providing security and access control in a network model is disclosed. The method may include generating a network model including a plurality of process entities. It should be noted that each of the plurality of process entities may be one of a goal-type entity, an interaction-type entity, a process-type entity, a responsibility-type entity, a role-type entity, a task-type entity, and a team-type entity. Each of the plurality of process entities may be represented by a corresponding node on a node-based User-Interface. Further, each of a plurality of nodes corresponding to the plurality of entities may be configured to be linked with at least one of remaining nodes of the plurality of nodes in the node-based User-Interface, via an interconnection network link. The method may further include receiving one or more attributes associated with each of the plurality of nodes. The method may further include creating an access control policy for a target node of the plurality of nodes. The method may further include creating an access control policy for a target node of the plurality of nodes. The access control policy may be configured to allow at least one user to access the target node. It should be noted that accessing the target node may include at least one of: view the attributes associated with the target node, modifying the attributes associated with the target node; or modifying an interconnection network link between the target node and another node of the plurality of nodes.

In another embodiment, a system for providing security and access control in a network model is disclosed. The system may include a processor and a memory communicatively coupled to the processor. The memory may store processor-executable instructions, which, on execution, may cause the processor to generate a network model including a plurality of process entities. It should be noted that each of the plurality of process entities may be one of a goal-type entity, an interaction-type entity, a process-type entity, a responsibility-type entity, a role-type entity, a task-type entity, and a team-type entity. Each of the plurality of process entities may be represented by a corresponding node on a node-based User-Interface. Each of a plurality of nodes corresponding to the plurality of entities may be configured to be linked with at least one of remaining nodes of the plurality of nodes in the node-based User-Interface, via an interconnection network link. The processor-executable instructions, on execution, may further cause the processor to receive one or more attributes associated with each of the plurality of nodes. The processor-executable instructions, on execution, may further cause the processor to create an access control policy for a target node of the plurality of nodes. The access control policy may be configured to allow at least one user to access the target node. Accessing the target node may further include at least one of: view the attributes associated with the target node; modify the attributes associated with the target node; or modify an interconnection network link between the target node and another node of the plurality of nodes.

In yet another embodiment, a non-transitory computer-readable medium storing computer-executable instruction for providing security and access control in a network model is disclosed. The stored instructions, when executed by a processor, may cause the processor to perform operations including generating a network model including a plurality of process entities. It should be noted that each of the plurality of process entities may be one of a goal-type entity, an interaction-type entity, a process-type entity, a responsibility-type entity, a role-type entity, a task-type entity, and a team-type entity. Each of the plurality of process entities may be represented by a corresponding node on a node-based User-Interface. Each of a plurality of nodes corresponding to the plurality of entities may be configured to be linked with at least one of remaining nodes of the plurality of nodes in the node-based User-Interface, via an interconnection network link. The operations may further include receiving one or more attributes associated with each of the plurality of nodes. The operations may further include creating an access control policy for a target node of the plurality of nodes. The access control policy may be further configured to allow at least one user to access the target node. Accessing the target node may include at least one of: view the attributes associated with the target node; modifying the attributes associated with the target node; or modifying an interconnection network link between the target node and another node of the plurality of nodes.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

Figure 1:
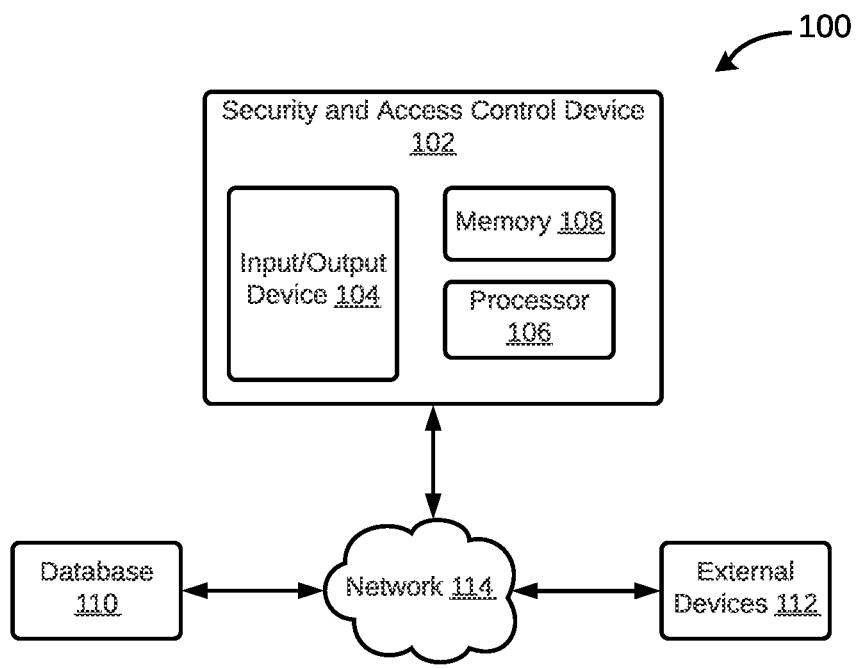
FIG. 1 illustrates a block diagram of an exemplary system for providing security and access control in a network model, in accordance with some embodiments of the present disclosure.

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

The present disclosure provides designing and modeling of security and access control policy of software systems/applications. By way of an example, in an organization, to achieve a goal, one or more responsibilities must be defined to achieve that goal. For each responsibility, there may be one or more tasks associated to fulfill that responsibility. Further, each task may be achieved through an interaction or a process flow. Each task is assigned to a user or a team of users directly via an assigned responsibility or indirectly via assigned roles in the organization. Further, each user may have their defined one or more responsibilities, depending on their roles, to perform one or more tasks associated with the responsibilities.

The provided security and access control policy may also include support for ACI part of RACI. In other words, Accountable, Consulted and Informed are added alongside responsibility (in RACI model) to be connected to the tasks and assigned to users and/or teams. ACI may also be scoped at the user/team level similar to roles/responsibilities.

Thus, in addition to considering assigned responsibilities for defining security and access control policies, it may be desirable to also take into consideration user's one or more tasks for which they are accountable, consulted and informed. Furthermore, a scope may be defined for each goal, task, or process flow, responsibility, and each task, for which the user is accountable, consulted and informed, where the scope may characterize, structure and limit each of them for the user. Such defined planning and framework may enable effectively reaching a goal in the organization.

For executing planning to achieve a goal, in real world systems, users may use dedicated systems, such as a computer, installed with and executing one or more software applications. The software systems/applications have underlying security and access control layers. Depending on the goal, task, or process flow, responsibility assigned to a particular user and user's each task/goal, for which the user is accountable, consulted and informed, the user is granted access to one or more underlying components/layers in the framework of the software systems/applications. Based on the granted access, the user is able to access one or more graphical user screen interfaces of the software systems/applications to perform or execute the task and responsibility assigned to him in the software systems/applications. The graphical user screen interfaces communicate with one or more databases related to them via related Application Programming Interfaces (APIs) to fetch related data and provide it to the users via the accessed graphical user screen interfaces of the software systems/applications.

The present disclosure provides designing and modeling of the security and access control layers of the software systems/applications for providing highly dynamic, flexible and multi-dimensional policy for the security and access control layers. The designed security and access control policy is highly comprehensive and connected, because it includes multiple nodes and connections between these nodes, where the nodes may represent any one of a user, role, task, process flow, goal, responsibility, one or more tasks/goals for which a user is accountable, consulted or informed, and the connections between the nodes may help in defining scope over these nodes.

The scope may include attributes limiting the span of the multiple nodes and the interconnecting relationships between these multiple nodes which may represent a user, teams, goal, task, process flow, responsibility, and one or more tasks/goals for which a user is accountable, consulted or informed. In an embodiment, the attributes may act as links as to how the nodes are connected to each other. Thus, these interconnecting relationships may limit the scope of the nodes, and so, provide a filtering mechanism for what each node may indicate and cover a reach.

Hence, the security and access control policy is multi-dimensional. For example, one user node may be connected to multiple task type nodes, which may be further connected to multiple responsibility type nodes, and multiple informed type nodes both. Each node may be connected via a connection between the user and the task type, between the task and the responsibility type, and/or between the task and the informed type, in the given example. The scope may be defined by the combination of the nodes and their connections with each other.

Such multi-dimensional security and access control policy may provide a sophisticated triangulation in the connected model, for example, for quickly finding a user, and his assigned task for which he is responsible and informed, based on the role.

In an embodiment, the present disclosure provides designing and modeling of the security and access control policy to provide access control at the task type level. The security and access control policy may provide a user with security access on the task, itself, that is assigned to him/her. The security and access control policy may thus act as a gatekeeper for the security access, allowing or blocking access to task execution at the entry point itself. In an embodiment, a component—an interaction—enables a user to execute a task that is assigned to him/her, and the interaction acts as a gatekeeper for the security access, allowing or blocking access to its execution at the entry point itself.

Thus, by providing access control at the task type level or at the entry level (i.e., interaction), the user, inherently, is granted access to all the process flows falling under a given task. This removes the need for the software system/application to grant the user with access to all the underlying resources that support the entire interaction with the software system/application to execute the entire task. Thus, any changes to the interaction and its access to underlying resources do not impact the security policies, reducing the brittleness in the security policies that model the real-world security needs of business.

Further in an embodiment, the security and access control policy disclosed herein may also use traditional Role Based Access Control (RBAC) methods to support responsibility assignments at various levels. Security policies are defined with tasks at the lowest level of access control, tasks associated with responsibilities, responsibilities that belong to roles, roles and/or responsibilities that are assigned to users and/or teams define the security policy.

The present security and access control architecture is an integral part of an organization's business working model system, with interconnected data and information models, providing the ability to seamlessly walk the security policy information and the information in the business domain to apply scoping rules.

In an embodiment, a directed node-based user interface may provide for an intuitive way to network model very complex RBAC security policies connecting tasks, responsibilities, roles, teams, accountable, consulted, and informed. The present security and access control policy being multi-dimensional may be implemented and visualized intuitively on the interactive user interfaces for connecting complex RACI in a role-based access control model.

Also, a directed node-based user interface may also provide for an intuitive way to model very complex access scoping rules. Thus, the disclosure may provide an access control model that resolves RBAC, ACI (Accountable, Consulted, Informed) and scoping policies to secure tasks, interactions and information access.

In an alternate embodiment, the present security and access control policy may be implemented at a different kind of graphical user interface, may be, separate screens to maintain different elements of the security model and connections between those elements. In an exemplary business organization, assigning security and access control rights may depend on certain roles and responsibilities of the users or teams in the organization. Also, to achieve goals or perform tasks, a number of user and/or team are employed. With time and situations, such roles and responsibilities of the same users and teams may be modified like expanded or narrowed down, or assigned with new tasks etc. It also may mean that for some goals or tasks, the organization may decide to assign roles and responsibilities to more users or may take away them from some users. Such modifications in the roles and responsibilities of the users may happen at small level or at a large level. Depending on such frequent modifications in the roles and responsibilities, the security and access control rights which are granted to the users, related to their roles and responsibilities, may also be affected. Therefore, to implement such modifications in the security and access control rights for the software applications/systems executed in a business organization, the present disclosure utilizes the present security and access control policy.

Modifying the security and access control policy in turn updates the security and access control rights for the users. And, such modification may be easily and quickly done in the security and access control policy of the present disclosure. Further, implementing the security and access control policy of the present disclosure on a graphical user interface may also provide a user with an intuitive visual, where the user is able to easily view his/her roles and responsibilities, and connected tasks and goals with such roles and responsibilities. Additionally, it may be easy for the user to directly see goals, roles, responsibilities and tasks for which the user may be accountable, consulted and informed.

Furthermore, in an embodiment, for a particular user, the graphical user interface may also provide the user with connected views, showing all the connected entities, such as other users and their roles and responsibilities, related tasks, related goals, roles, responsibilities and tasks for which they are accountable, consulted and informed, connected directly or indirectly to the user/the viewer.

The user may be able to easily and quickly view such connected views, in the multi-dimensional security and access control model at an interactive graphical user interface. Also, the user may be able to walk through the multi-dimensional security and access control model and is able to quickly trace the connections and triangulate to a concerned node or entity from more than one direction, such as triangulate to a particular task type from the user's responsibility type view or direction for which the user is responsible and other from an accountability type view or may also from a direction of another user who is accountable for the same task, for more connected information.

Referring to FIG. 1, a block diagram of system 100 providing security and access control in a network model is illustrated, in accordance with some embodiments of the present disclosure. The system 100 may create and manipulate a multi-dimensional model for security and access control policies, in accordance with some embodiments of the present disclosure. The multi-dimensional model may illustrate/represent the security and access control policies underlying a software system/application or applied in a business organization. By creating and modeling the multi-dimensional model, the security and access control policies, in turn, are created and modeled.

The system 100 may include a security and access control device 102 with processing capabilities for viewing and manipulating/modeling the security and access control policies. Manipulating may include modifying the security and access control model by adding, deleting, updating or changing the any attribute of the model. Examples of the security and access control device 102 may include, but are not limited to a server, a desktop, a laptop, a notebook, a net book, a tablet, a smartphone, or a mobile phone. The security and access control device 102 may include an input/output (I/O) device 104 that may be responsible for capturing information and data, for processing, and in turn displaying a processed output. By way of an example, the I/O device 104 may be used to display results of analysis performed by the security and access control device 102, to the user. By way of another example, the I/O device 104 may be used by the user to provide inputs to the security access and control device 102. Thus, for example, in some embodiments, the security access and control device 102 may ingest information such as an input to generate a network model, and attributes associated with the nodes to create access control policies for nodes via a user interface of the I/O device 102 (not shown in FIG. 1). Further, for example, in some embodiments, the security access and control device 102 may render results to the user/administrator via the user interface. The input/output device 104 may include, but is not limited to, a keyboard, a mouse, a microphone, a scanner, a joystick, a monitor, a digital screen, and a printer.

The security and access control device 102 may further include a processor 106, which may be communicatively coupled to a memory 108. The memory 108 may store processor instructions, which when executed by the processor 106 may cause the processor 106 to create and modify the multi-dimensional model in turn to modify the security and access control underlying policies. This is further explained, in detail in conjunction with FIGS. 2-6. The processor 106 in conjunction with the memory 108 may perform various functions including generating the network model, receiving attributes associated with nodes, creating access control policies, modifying attributes, modifying interconnection network links, and the like.

The memory 108 may store various data (for example, plurality of nodes, attributes associated with nodes, link data, and the like) that may be captured, processed, and/or required by the security and access control device 102. The memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random-Access Memory (DRAM), and Static Random-Access memory (SRAM).

Moreover, the security and access control device 102 may be communicatively coupled to database 110 storing information related, including but not limited to, one or more users of the software system/application and/or of the business organization, one or more information related to business processes in the business organization or information related to the business organization. It may be apparent to a person skilled in the art that the database 110 may include any type of information required by the system 100 and the security and access control device 102, without deviating from the meaning and scope of the present disclosure. The database 110 may be updated periodically with a new set of parameters corresponding to the information stored in it. Additionally, the security and access control device 102 may be communicatively coupled to an external device 112 via network 114 for sending and receiving various data. Examples of the external device 112 may include, but is not limited to, a remote server, digital devices, and a computer system.

The network 114 may correspond to a communication network. The communication network 114, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS). In some embodiments, the database 110 may be directly coupled to the security and access control device 102. In some other embodiments, the database 110 may be coupled to the security and access control device 102 via the network 114.

Figure 2:
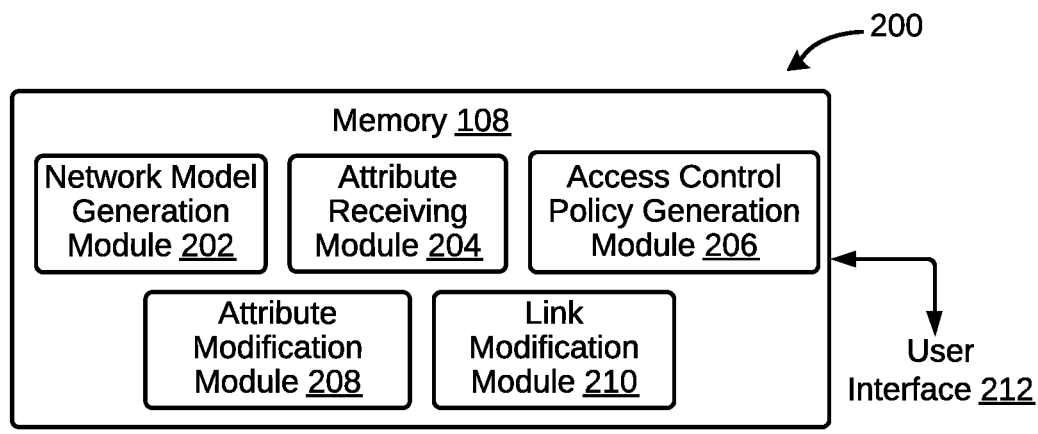
FIG. 2 illustrates a functional block diagram of various modules within memory of a security and access control device, in accordance with some embodiments of the present disclosure.

Referring now to FIG. 2, a functional block diagram of various modules 202-210 within memory 108 of the security and access control device 102 is illustrated, in accordance with some embodiments of the present disclosure. The security and access control device 102 may act as an interactive interface for providing security and access control policies. The security and access control device 102 may include a network model generation module 202, an attribute receiving module 204, an access control policy generation module 206, an attribute modification module 208, and a link modification module 210, to perform various function to provide security and access control. Further, in one embodiment, a user may provide inputs to the modules 202-210 via a user interface 212. In some other embodiments, the user may be able access the nodes of the network model via the user interface 212.

The network model generation module 202 may be configured to generate a network model (for example, a network model 600a). Here, the network model may include a plurality of process entities. For example, the process entities may include, but are not limited to, a goal-type entity, an interaction-type entity, a process-type entity, a responsibility-type entity, a role-type entity, a task-type entity, and a team-type entity. Further, the network model generation module 202 may include various sub-module, which may be responsible for generating the network model. By way of an example, the network model generation module 202 may include a goal type module, a roles and RACI type module, a task type module, an interaction type module, a team type module, and the like.

For example, the goal type module may be responsible for receiving goals via the user interface 212. The goal may include primary goals and secondary goals. In one scenario, the primary goal may be a fundamental objective associated with a business. Functions of the sub-modules may be explained in greater detail in conjunction with FIG. 3.

It should be noted that the network model generation module 202 may represent each of the plurality of process entities by a corresponding node on a node-based User-Interface (for example, the user interface 212). For example, a goal may be represented by a one node, and an associated task may be represented by another node. Further, each of a plurality of nodes corresponding to the plurality of entities may be linked with at least one of remaining nodes of the plurality of nodes, by the network model generation module 202, in the user interface 212. For example, the plurality of nodes corresponding to the goal and task may be interconnected via an interconnection network link.

In short, the plurality of nodes may represent any one of a user, a role type, a task type, a secondary task type, a goal type, a responsibility type, one or more task type for which a user may be accountable, consulted or informed, and the interconnection network links between each two of the plurality of nodes corresponding to the plurality of entities may represent connection between the plurality of nodes.

The attribute receiving module 204 may be configured to receive one or more attributes associated with each of the plurality of nodes. The one or more attributes may include at least one of: a type of goal associated with the entity, a type of interaction associated with the entity, a type of process associated with the entity, a type of responsibility associated with the entity, a type of role associated with the entity, a type of task associated with the entity, and a type of team associated with the entity. The attribute receiving module 204 may be communicatively couples to the network model generation module 202, the access control policy generation module 206, attribute modification module 208, and link modification module 210.

The access control policy generation module 206 may be configured to generate an access control policy for a target node of the plurality of nodes. Based on the generated access control policy a user may be allowed to access the target node of within the network model, via the user interface 212. Further, by accessing the target node, the user may be able to view the attributes associated with the target node. In some embodiments, the access control policy may be created by an administrator-designated user using the access control policy generation module 206.

The attribute modification module 208 may be configured to modify the attributes associated with the target node. In other words, the user may be able to perform some modification in the attributes associated with the target node using the attribute modification module 208. Further, in one embodiment, the attribute modification module 208 may modify the interconnection network link between the target node and an interconnected node to which the target is interconnected. In an alternate embodiment, the attribute modification module 208 may modify the attributes associated with the interconnected node.

The link modification module 210 may be configured to an interconnection network link between the target node and another node of the plurality of nodes. By way of an example, the user may modify the interconnection network link between the target node and another node of the plurality of nodes, using the link modification module 210. In some embodiments, the link modification module 210 may modify the attributes associated with the interconnected node.

Figure 3:
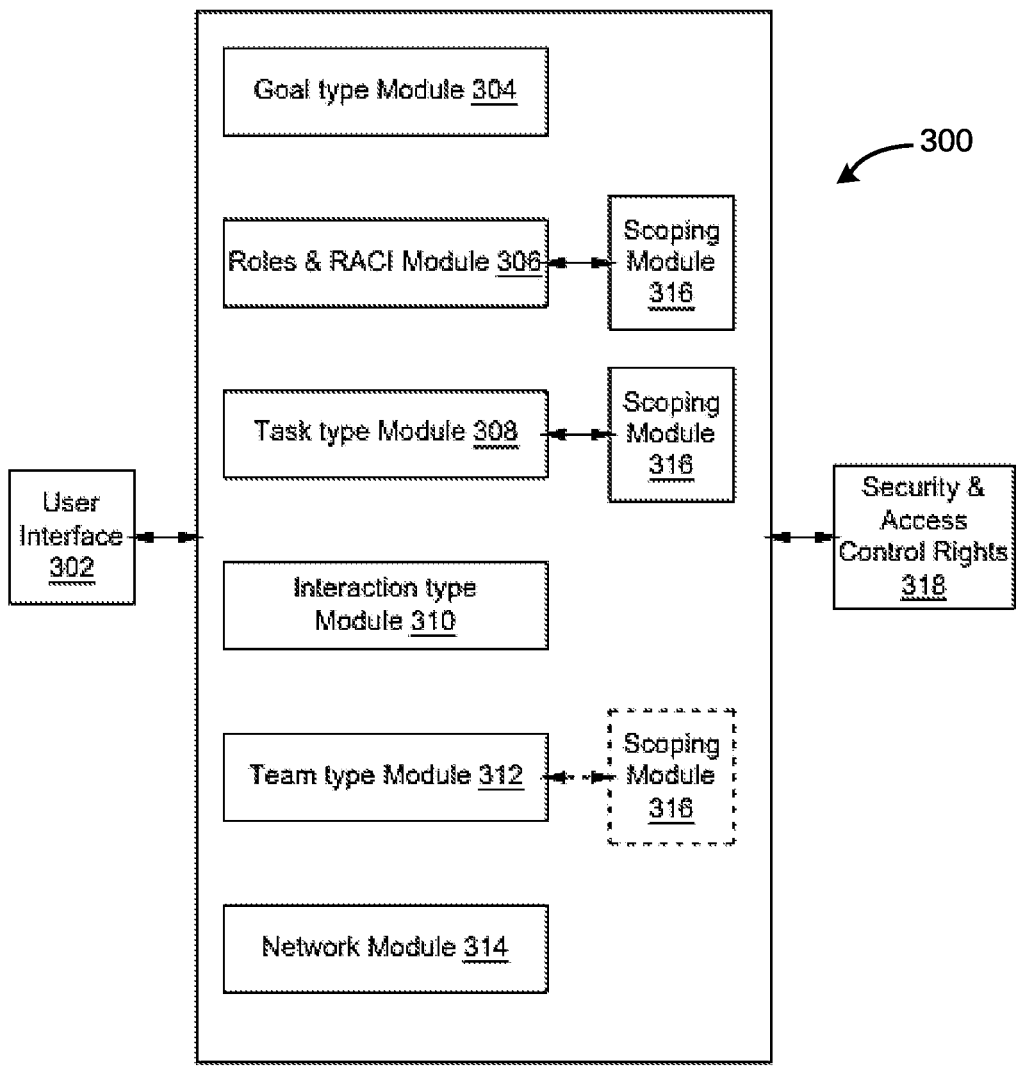
FIG. 3 illustrates a block diagram of a system for creating and modifying a multi-dimensional model for the security and access control policy, in accordance with another embodiment of the present disclosure.

Referring now to FIG. 3, a block diagram of a system 300 for creating and modifying a multi-dimensional model for the security and access control policy is illustrated, in accordance with some embodiments of the present disclosure. FIG. 3 is explained in conjunction with FIGS. 1-2. In some embodiments, the multi-dimensional model may correspond to the network model. The system 300 may a user interface (UI) 302 to provide inputs to modules 304-316, and for displaying results of analysis to the user. Further, the system 300 may include the modules 304-316, for example a goal type module 304, an ACI type module (Role & RACI) module 306, a task type module 308, an interaction type module 310, a team type module 312, a network module 314, and a scoping module 316, in order to perform various function, to provide security and access control.

In an embodiment, for creating and modeling the security and access control policies, the goal type module 304 may receive a primary goal via the UI 302. In an embodiment, the goal type module 304 may receive a modification in a primary goal via the UI 302. In some scenarios, the primary goal may be a core objective associated with a business. In some exemplary scenarios, the primary goal associated with a hospital may correspond to healing back pain of a patient. Additionally, the system 300 may also include a secondary goal module (not shown in FIG. 3), which may receive a set of secondary goals associated with the primary goal via the UI 302 once a primary goal associated is determined. Examples of the set of secondary goals associated with an exemplary primary goal of healing the back pain of a patient may include, but is not limited to, learning key clinical data and medical history of the patient, identifying a reason for the back pain, identifying treatment for the back pain, identifying conservative back treatment details, and identifying surgical back treatment detail.

A user may interact with the UI 302 to add or modify required goals and/or secondary goals, and the system 300 may implement this modification in the goals and/or secondary goals, using the goal type module 304, in the multi-dimensional model of the security and access control policies. In an embodiment, implementing this modification in the multi-dimensional model would further modify the security and access control policies and rights of the users related to these goals and/or secondary goals, and also for these goals and/or secondary goals. In an embodiment, a user may interact with the UI 302 to modify goals and/or secondary goals for the roles/responsibilities/tasks that the user has security and access control rights.

In an embodiment, while, adding or modifying the goals and/or secondary goals for one or more users or a team, the system 300 may also provide a provision for utilizing the scoping module 316, to assign scoping to each of the goals and/or secondary goals for each one or more users or team. Assigning scoping to the goals and/or secondary goals may create limitations for them, where the scoping module 316 may implement a filtering mechanism on these entities, such as goals. The system 300 may implement this modification in the scope related to the goals and secondary goals, in the multi-dimensional model of the security and access control policies.

In some embodiments, to allow access to the node, an access request may be received from a user for accessing a target node. Thereafter, a user profile of the user may be fetched from a data repository. It should be noted that the data repository may store user profiles of various user related with the business model. For example, in a hospital business model, the various users may include doctors, nurses, patients, laboratory experts, diagnostic experts, hospital administrators, support staff, etc. The user profile may include a role-data, a responsibility-data, an accountable-data, a consulted-data, or an informed-data associated with the user. Upon fetching the user profiles, the user profiles may be mapped with the one or more attributes associated with the target node, based on the mapping, access may be allowed to the user for accessing the target node. It should be further noted that allowing to the access may include viewing at least one of the one or more attribute associated with the target node, or modifying at least one of the one or more attributes associated with the target node, or modifying an interconnection network link between the target node and another node of the plurality of nodes. In other words, allowing the access may imply selectively allowing the user to perform one of the above operations—for example, the user may be allowed only to viewing an attribute associated with the target node, or only modify an attribute associated with the target node, or only modify an interconnection network link.

In other words, based on the goals associated with the primary goal, the roles and RACI module 306 may receive a set of names of users via the UI 302, for performing a set of associated tasks, based on the roles of those people. The roles & RACI module 306 may be employed to add, delete or modify a role, and a responsibility, and also one or more tasks/goals for which a user is accountable, consulted, and informed (RACI).

In an example scenario, when a user request is received (of from a doctor to update a task (i.e., a next task in the treatment of the patient, for example, the task may be "conduct X-Ray scan") for a node associated with a patient, the system 300 may fetch the user profile of the doctor. As mentioned above, the user profile of the doctor may include the role-data, the responsibility-data, the accountable-data, the consulted-data, and the informed-data associated with the doctor. The system 300 may further map the doctor's user profile with the one or more attributes associated with the target node (of the patient). Based on the mapping, access may be allowed to the doctor for accessing the target node of the patient. For example, role-data of the doctor's user profile may include data related to tasks that the doctor is allowed to perform and data related to the patients for which the doctor is allowed to perform the tasks. Therefore, only when the role-data of the doctor's user profile matches with the task-data of the patient, then the doctor may be allowed to update the status.

Accordingly, the roles and RACI module 306 may receive a set of assigned responsibilities, and assigned one or more tasks/goals for which a user is accountable, consulted, and informed for each of the set of users. Some examples of the set of users with the set of assigned responsibilities may include, a nurse for gathering clinical data and medical history of the patient, a nutritionist for nutrition design for a plurality of patients, a physiotherapist for physiotherapy design for the plurality of patients, and a radiologist for radiography imaging for the plurality of patients.

While, assigning the roles, responsibilities, one or more tasks/goals for which a user is accountable, consulted, and informed for one or more users or one or more teams, the system 300 may also provide a provision for utilizing the scoping module 316, to assign scoping to each of the roles, responsibilities, one or more tasks/goals for which a user is accountable, consulted, and informed for each one or more users or teams. Assigning scoping to roles and RACI may create limitations for them, where the scoping module 316 may implement a filtering mechanism on these entities, such as roles and RACI.

A user may interact with the UI 302 to add and/or modify required roles, responsibilities, one or more tasks/goals for which a user is accountable, consulted, and informed. A user may also interact with the UI 302 to add and/or modify scope to each of the roles and RACI using the scoping module 316. The system 300 may implement this modification in the roles & RACI entities and their related scope, using the roles & RACI module 306 and the scoping module 316, in the multi-dimensional model of the security and access control policies.

In an embodiment, implementing this modification in the multi-dimensional model would further update the security and access control policies of the users related to these roles & RACI and also for these roles & RACI. In an embodiment, a user may interact with the UI 302 to modify required roles, responsibilities, one or more tasks/goals for which a user is accountable, consulted, and informed and their related scope for the roles/responsibilities/tasks that the user has security and access control rights. Furthermore, based on the assigned roles & RACI, the task type module 308, may receive a set of tasks, via the UI 302, associated with the set of goals. It should be noted that each of the set of tasks may be required to be performed in order to achieve the set of goals. In some embodiments, each of the set of tasks may include a plurality of secondary tasks that may be required to be completed, in order to complete the set of tasks. In some embodiments, the set of tasks may include, but is not limited to, gathering key clinical and medical history of the patient, diagnosing the back pain, diagnosing stages of the back pain, gathering treatment drivers and scoring treatment options for the back pain, gathering treatment details and drivers, evaluating the drivers and defining the treatment details, testing and identifying drivers to define treatment in detail, and evaluating the drivers and defining the treatment in detail.

In an embodiment, while, defining the tasks for a set of goals based on the roles and RACI of one or more users or a team, the system 300 may also provide a provision for utilizing the scoping module 316, to assign scoping to each of the tasks and/or secondary tasks for each one or more users or teams. Assigning scoping to the tasks and/or secondary tasks may create limitations for them, where the scoping module 316 implements a filtering mechanism on these entities, such as tasks and/or secondary tasks.

A user may interact with the UI 302 to add and/or modify required tasks and/or secondary tasks. A user may also interact with the UI 302 to add and/or modify scope to each of the tasks and/or secondary tasks using the scoping module 316. The system 300 may implement this modification in the tasks and/or secondary tasks and their related scope, using the task type module 308 and the scoping module 316, in the multi-dimensional model of the security and access control policies.

In an embodiment, implementing this modification in the multi-dimensional model would further modify the security and access control rights of the users, related to these tasks and/or secondary tasks, and also for these tasks and/or secondary tasks. In an embodiment, a user may interact with the UI 302 to modify tasks and/or secondary tasks and its related assigned scope for the tasks that the user has security and access control rights.

It may be apparent to a person ordinary skilled in the art, that the operations of the roles, responsibility & ACI module 306 and the task type module 308 are related to each other, for example tasks may be assigned based on the defined roles and RACI, i.e., a top to bottom approach for assigning tasks to defined roles and RACI.

Also, in alternate embodiments, the system 300 may first create tasks to be performed to achieve a primary goal, and further based on these defined tasks, the system 300 may assign the roles and RACI to the users, i.e., a bottom to top approach for assigning roles and RACI to defined tasks, without deviating from the meaning and scope of the present disclosure.

Also, the system 300 may define the scoping at different levels. In some embodiments, the system 300 may define the scoping at least one of a user level, a team level, a role level, a responsibility type level, a task-type or secondary task type level, accountability type level, consulted type level, informed type level. In an embodiment, the system 300 may define the scoping at one or more levels as described, in any combination.

As and when the system 300 adds or modifies or updates the goals, the secondary goals, roles, responsibility, the tasks, the secondary tasks, one or more tasks/goals for which a user is accountable, consulted, and informed and their related assigned scopes, entities in the form of nodes, corresponding to each one of them, may be created in the multi-dimensional model for the security and access control policies. Also, the nodes may pre-exist in the model and the user interaction with the UI 302 may also update the information/attributes related to the nodes. Thus, entities or nodes in the multi-dimensional model may include and are not limited to the goals, the secondary goals, roles, the responsibility, the tasks, the secondary tasks, and one or more tasks/goals for which a user is accountable, consulted, and informed. For example, the attributes may include a 2. The method of claim 1, wherein the one or more attributes comprise at least one of: a goal, an interaction, a process, a responsibility, a role, a task, and a team associated with the node. In other words, the one or more attributes may include at least one of: a type of goal associated with the entity, a type of interaction associated with the entity, a type of process associated with the entity, a type of responsibility associated with the entity, a type of role associated with the entity, a type of task associated with the entity, and a type of team associated with the entity.

Thereafter, based on the set of tasks and the roles and RACI in a goal, the interaction type module 310 may receive, via the UI 302, a real time data, corresponding to the entities or nodes, based on a real time activity performed related to the primary goal that needs to be achieved. Any kind of user interaction with the system 300 may take place through the UI 302. If the user interaction includes adding, updating, or manipulating the entities or nodes in the multi-dimensional model, then the same is updated in the model, using the interaction type module 310. Since, the interaction type module 310 may receive real time data on a real time activity, the interaction type module 310 may also be utilized in updating the multi-dimensional model for the security and access control policies in real time.

In another embodiment, based on the set of tasks, the interaction type module 310 may receive consumer data, based on a communication performed between an individual and a business professional, via the UI 302. By way of an example, an individual may correspond to a patient and the business professional may correspond to a doctor or a nurse. In some embodiments, the consumer data may include a name, an age, a weight, a height, and a cause of illness of the patient.

Moreover, in some embodiments, the interaction type module 310 may be a part of the UI 302. In such embodiments, patient information may be displayed on left side of the UI 302. Additionally, in such embodiments, the UI 302 may display a form on right side to capture the consumer data based on a communication between the patient and the doctor or the nurse by the input/output device 104.

Further, the team type module 312 may receive team information of at least one of the set of users via the UI 302 for performing roles, RACI and the related tasks. It should be noted that the set of users may be divided into a plurality of teams based on the set of assigned responsibilities and the set of associated tasks for each of the set of users. It should also be noted that the security and access control device 102 may be capable of monitoring progress of the achievement of the primary goal determined by the goal type module 304, and at a level of secondary goals determined by the secondary goal type module.

After creating or updating the entities or nodes in the multi-dimensional model, the network module 314 may receive, via the UI 302, an input related to interconnection between the individual entities or the nodes. Such input may represent data/attributes including and not limited to how, what and may be why each of the individual entities or the nodes are connected with each other. Such input may be referred to as "interconnection networking input". In an embodiment, the interconnection networking input may be unidirectional or bidirectional.

In an embodiment, while the information at the nodes or the entities represent information related to the users, teams, goals, secondary goals, tasks, secondary tasks, and each of R-, A-, C-, and I-, the interconnection networking input may represent information/attributes on how, what and why each of the individual entities or corresponding nodes are connected with each other. Furthermore, in an embodiment, a combination of the information represented by the nodes and the interconnection networking inputs may also provide information representing a scope, for the user and/or teams, over the nodes or the entities including goals, secondary goals, tasks, secondary tasks, and each of R-, A-, C-, and I- and/or the interconnection networking inputs. The scope may apply a filtering mechanism over the information/attributes represented by the nodes and/or the interconnection networking inputs, hence narrowing them down Further, a user may interact with the UI 302 to add and/or modify required interconnection networking inputs, and the system 300 may implement this modification in the interconnection networking inputs, using the network module 314, in the multi-dimensional model of the security and access control policies. In an embodiment, implementing this modification in the multi-dimensional model would further modify the security and access control rights of the users, related to these interconnection networking inputs. In an embodiment, a user may interact with the UI 302 to modify interconnection networking inputs for which the user has security and access control rights.

As a result of creating and modeling the information related to the goals, secondary goals, tasks, secondary tasks, and each of R-, A-, C-, and I- and/or the interconnection networking inputs, using the goal type module 304, the Roles & RACI module 306, the task type module 308, the team type module 312, the network module 314 and the interaction type module 310, the system 300 may resultantly create, update or manipulate security and access control policies/rights for one or more users, or one or more teams in an organization (represented as block 318 in FIG. 3). Thus, the multi-dimensional model of the security and access control policies may include a plurality of entities or corresponding nodes providing information related to at least one of the users, teams, goals, secondary goals, tasks, secondary tasks, and each of R-, A-, C-, and I-, and where the plurality of nodes or the corresponding entities are interconnected by the interconnection networking inputs, individually or in any combination. This multi-dimensional model of the plurality of nodes interconnected via the interconnection networking inputs may represent the security and access control policies, which in turn may be used to control the security and access control policies underlying the software application/system, and/or in the business organization.

It should be noted that all such aforementioned modules 304-316 may be represented as a single module or any combination of different modules. Further, as will be appreciated by those skilled in the art, each of the modules 304-316 may reside, in whole or in parts, on one device or multiple devices in communication with each other. In some embodiments, each of the modules 304-316 may be implemented as dedicated hardware circuit comprising custom application-specific integrated circuit (ASIC) or gate arrays, off-the-shelf semiconductors such as logic chips, transistors, or other discrete components.

Each of the modules 304-316 may also be implemented in a programmable hardware device such as a field programmable gate array (FPGA), programmable array logic, programmable logic device, and so forth. Alternatively, each of the modules 304-316 may be implemented in software for execution by various types of processors (e.g., processor 106). An identified module of executable code may, for instance, include one or more physical or logical blocks of computer instructions which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices Further, it should be noted that, the security and access control device 102 may be implemented in programmable hardware devices such as programmable gate arrays, programmable array logic, programmable logic devices, or the like. Alternatively, the system 100 and associated security and access control device 102 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for providing security and access control. For example, the exemplary system 100 and associated security and access control device 102 may create the process plan, by the process discussed herein. In particular, as will be appreciated by those of ordinary skill in the art, control logic and/or automated routines for performing the techniques and steps described herein implemented by the system 100 and the associated security and access control device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 4:
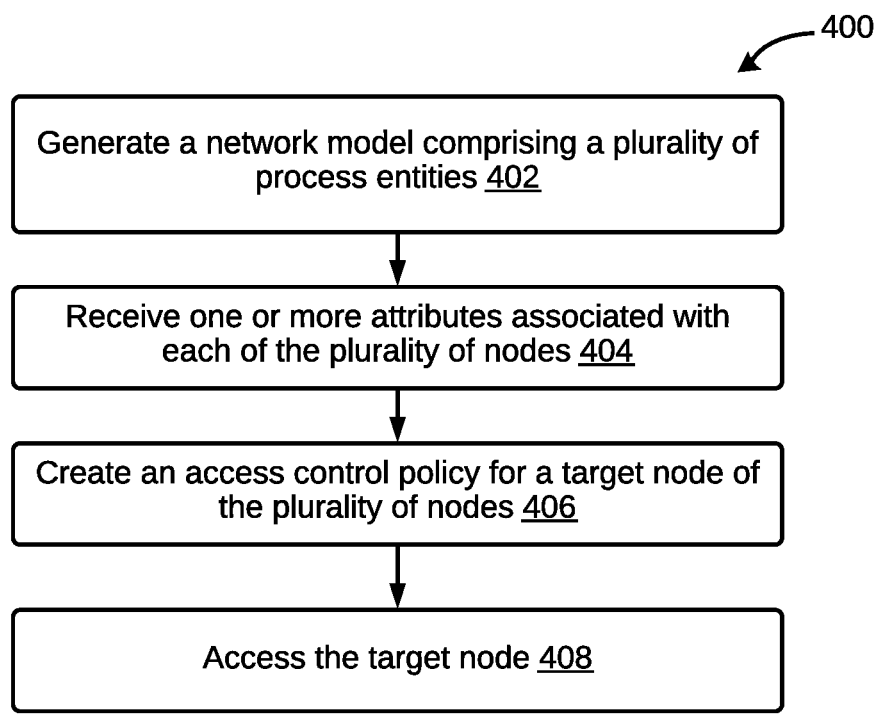
FIG. 4 illustrates a flowchart of a method for providing security and access control, in accordance with some embodiments of the present disclosure.

Referring now to FIG. 4, a method 400 for providing security and access control is depicted via a flow diagram, in accordance with some embodiments of the present disclosure. Each step of the method 400 may be performed by the security and access control device 102. FIG. 4 is explained in conjunction with FIGS. 1-3.

At step 402, a network model may be generated. The network model may include a plurality of process entities. An exemplary network model may be shown further in FIG. 6. The plurality of process entities may be one of a goal-type entity, an interaction-type entity, a process-type entity, a responsibility-type entity, a role-type entity, a task-type entity, and a team-type entity.

It should be noted that each of the plurality of process entities may be represented by a corresponding node on a node-based User-Interface. Further, each of a plurality of nodes corresponding to the plurality of entities may be configured to be linked with at least one of remaining nodes of the plurality of nodes in the node-based User-Interface, via an interconnection network link. In other words, the plurality of nodes may represent any one of a user, a role type, a task type, a secondary task type, a goal type, a responsibility type, one or more task type for which a user may be accountable, consulted or informed, and the interconnection network links between each two of the plurality of nodes corresponding to the plurality of entities may represent connection between the plurality of nodes.

In one example, if a node represents a role type 'tester', with a responsibility type 'thyroid testing' and 'metabolism testing', and where the responsibility type 'thyroid testing' needs' a task type 'test thyroid function' to be executed. In this example, 'tester', 'thyroid testing', 'metabolism testing' and 'test thyroid function' are all nodes, while 'has' and 'needs' are the interconnection network links between them, representing connections and/or limitations on the role type 'tester', associated with a user, and the responsibility type 'thyroid testing'.

At step 404, one or more attributes associated with each of the plurality of nodes may be received. The one or more attributes may include at least one of: a type of goal associated with the entity, a type of interaction associated with the entity, a type of process associated with the entity, a type of responsibility associated with the entity, a type of role associated with the entity, a type of task associated with the entity, and a type of team associated with the entity.

At step 406, an access control policy for a target node of the plurality of nodes may be created. It should be noted that the access control policy may be configured to allow at least one user to access the target node. Also, it should be noted that the access control policy may be created by an administrator-designated user.

At step 408, a designated user may access the target node. In some embodiments, the user may be designated on the basis of a role of the user, a responsibility of the user, to and what the user is accountable for, what the user is consulted for, or what the user is informed about. In other words, user may be designated based on at least one of a role-data, a responsibility-data, an accountable-data, a consulted-data, or an informed-data associated with the user. Further, accessing the target node may allow the designated user to view at least one of the one or more attributes associated with the target node. In some embodiments, accessing the target node may allow the user to modify at least one of the one or more attributes associated with the target node. In another embodiment, accessing the target node may allow the user to modify an interconnection network link between the target node and another node of the plurality of nodes.

Further, in some embodiments, to modify the attributes associated with the target node, the interconnection network link between the target node and an interconnected node to which the target is interconnected may be modifies. In some other embodiments, to modify the attributes associated with the target node, the attributes associated with the interconnected node may be modified. In some embodiments, to modify the interconnection network link between the target node and another node of the plurality of nodes, the attributes associated with the interconnected node may be modified.

In particular, by way of an example, to allow access to a user for accessing a target node, the method 400 may include receiving an access request from a user for accessing the target node and fetching a user profile of the user. The user profile may include a role-data, a responsibility-data, an accountable-data, a consulted-data, or an informed-data associated with the user. The method may further include mapping the user profile with the one or more attributes associated with the target node, and allowing access to the user for accessing the target node based on the mapping.

Figure 5:
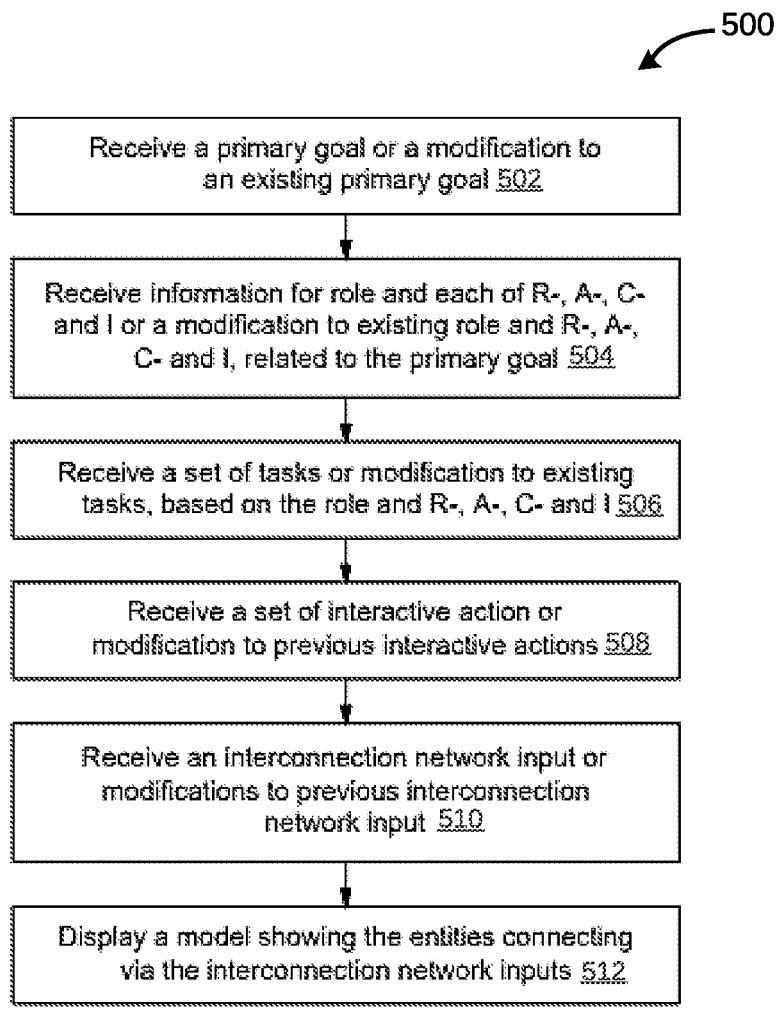
FIG. 5 illustrates a flowchart of a method for creating and dynamically modifying the network model of the security and access control policy, in accordance with some embodiments of the present disclosure.

Referring now to FIG. 5, a method 500 for creating and dynamically modifying the multi-dimensional model of the security and access control policies is depicted via a flow diagram, in accordance with some embodiments of the present disclosure. The multi-dimensional model may correspond to the network model. method 500 should be read and understood in conjunction with the FIGS. 1-4 and include at least one or more of the embodiments of the system described in the FIGS. 1-4. Further, the method 500 may or may not follow a step flow as described by steps 502-512 in the flowchart 500 in FIG. 5. Steps 502-512 may be executed using the modules 304-316.

The method 500 may include receiving information of one or more users, via the UI 302, according to an embodiment. At step 502, a primary goal may be received using the goal type module 304, by the security and access control device 102 via the UI 302. Alternatively, the goal type module 304 may receive a modification in an existing primary goal via the UI 302. In an embodiment, the method 500 may also include receiving a set of secondary goals based on the primary goal. The method 500 may further include receiving a set of assigned roles, responsibilities, one or more tasks/goals for which a user is accountable, consulted or informed for each of a set of persons to perform the goal, at step 504, using the roles & RACI module 306. The method 500 may additionally include receiving a modification in existing assigned roles, responsibilities, and one or more tasks/goals for which a user is accountable, consulted or informed for each of the set of persons via the UI 302, at step 504.

At step 506, the method 500 may include receiving, using the task type module 308, a set of tasks based on the assigned roles & RACI, via the UI 302. In an embodiment, the task type module 308 may also receive secondary tasks included in the set of tasks. In an embodiment, a modification in existing set of tasks or secondary tasks may also be received using the task type module 308 via the UI 302 at step 506.

It may be apparent to a person ordinary skilled in the art, that the operations of the roles, responsibility & ACI module 306 at step 504, and the task type module 308 at the step 506 are related to each other. For example, tasks may be assigned based on the defined roles and RACI. While, in other embodiment, the system 100 may also first create tasks to be performed to achieve a primary goal, and further based on these defined tasks, the system 100 may assign the roles and RACI to the persons, and therefore, the steps of 504 and 506 do not necessarily executed in the flow as shown in the FIG. 5, without deviating from the meaning and scope of the present disclosure.

At step 508, a real time data or an interaction type data, corresponding to the entities or nodes, based on a real time activity performed related to the primary goal that needs to be achieved may be received by the interaction type module 310 via the UI 302. Additionally, the interaction type module 310 may also receive a modification in the previous interaction data at step 508. In another embodiment, at step 308 a set of interactive actions may be received for each of the set of persons, based on the set of associated tasks, to obtain consumer data. As already explained in conjunction to FIG. 3, the set of interactive action may include a communication between an individual and a business professional.

In an embodiment, the method 500 may include receiving information related to a team of at least one of the set of persons, by the team type module 312, via the UI 302. At a step 510, the method 500 may include receiving, by the network module 314 and via the UI 302, an input related to interconnection between the individual entities or nodes, also referred to as "interconnection networking input". Such input may represent data including and not limited to how, what and may be why each of the individual entities or nodes are connected with each other. In an embodiment, the network module 314 may also receive a modification in the previous interconnection networking inputs at step 510. In an embodiment, the interconnection networking inputs may be unidirectional or bidirectional.

In an embodiment, the interconnection networking inputs may include a direction between a first input and a second input to obtain the directional network, for each of a set of inputs. It should be noted that the set of inputs may include the primary goal, the set of secondary goals, the set of persons, the set of tasks, the team of at least one of the set of persons, and for each of the set of persons, the set of assigned responsibilities and the set of interactive actions. It should also be noted that the first input and the second input belong to the set of inputs.

After receiving all information/attributes in the steps 502-510, as explained above, the security and access control device 102 of the system 100 may create or update or modify the multi-dimensional model representing the security and access control policies.

At step 512, the multi-dimensional model of the security and access control policies may be displayed at the user interface (UI) 302. In an embodiment, consumer information may also be displayed in the multi-dimensional model at the UI 302. In some embodiments, the consumer information includes a set of open tasks, a set of available tasks, a set of completed tasks, a feedback, and the consumer data.

In other words, the method 500 may include creating and/or updating the multi-dimensional model having one or more hierarchical levels, such as a level-1, a level-2, a level-3, and so on. It may be noted that the hierarchical levels may not limit to three levels (level-1, level-2, and level-3) and may include lower or higher number of hierarchical levels as well. The method 500 may further include creating a plurality of entities. It may be noted that each of the one or more hierarchical levels may further include one or more entities. For example, the level-1 may include a first level-1 entity, a second level-1 entity, a third level-1 entity, and so on. Similarly, the level-2 may include a first level-2 entity, a second level-2 entity, a third level-2 entity, and so on. In some embodiments, the one or more entities belonging to the one or more hierarchical levels may be interlinked. The method 500 may further include receiving an entity-input corresponding to each of the one or more entities. The method 500 may further include receiving a link-input corresponding to each of the one or more interlinks that exist between the one or more entities belonging to the one or more hierarchical levels.

By way of an example, a level-1 entity-input received corresponding to first level-1 entity may include "treat back pain" (i.e., a text input). This first level-1 entity may act as a goal of the process plan. Further, a first level-2 entity-input and a second level-2 entity-input may be received corresponding to each of a first level-2 entity and a second level-2 entity. The first level-2 entity-input may include "medical intervention" and the second level-2 entity-input may include "physical exercise". The first level-2 entity-input and the first level-2 entity-input may at as secondary goals.

Further, a first level-3 entity-input, a second level-3 entity-input, and a third level-3 entity-input may be received corresponding to each of a first level-3 entity, a second level-3 entity, and a third level-3 entity. The first level-3 entity-input may include "surgery", and the second level-3 entity-input may include "oral medicine". The third level-3 entity-input may include "weight training". The first level-3 entity-input, the second level-3 entity-input, and the third level-3 may act as roles (or tasks) of the process plan.

It may be understood that the first level-3 entity-input ("surgery") and the second level-3 entity-input ("oral medicine") are related to the first level-2 entity-input ("medical intervention"). As such, the first level-3 entity-input ("surgery") and the second level-3 entity-input ("oral medicine") may be linked to the first level-2 entity-input ("medical intervention"). Similarly, the third level-3 entity-input ("weight training") is related to the second level-2 entity-input ("physical exercise"), and, therefore, may be linked with each other.

The entire model may be displayed via the user interface 302. In some embodiments, the one or more hierarchical levels i.e., the level-1, a level-2, a level-3, etc. and the one or more entities associated with the one or more hierarchical levels may be represented as nodes of a network at the user interface. Further, the nodes of the network may be interlinked. For example, secondary goals or roles corresponding to one goal may be linked to secondary goals or roles corresponding to another goal.

Figure 6:
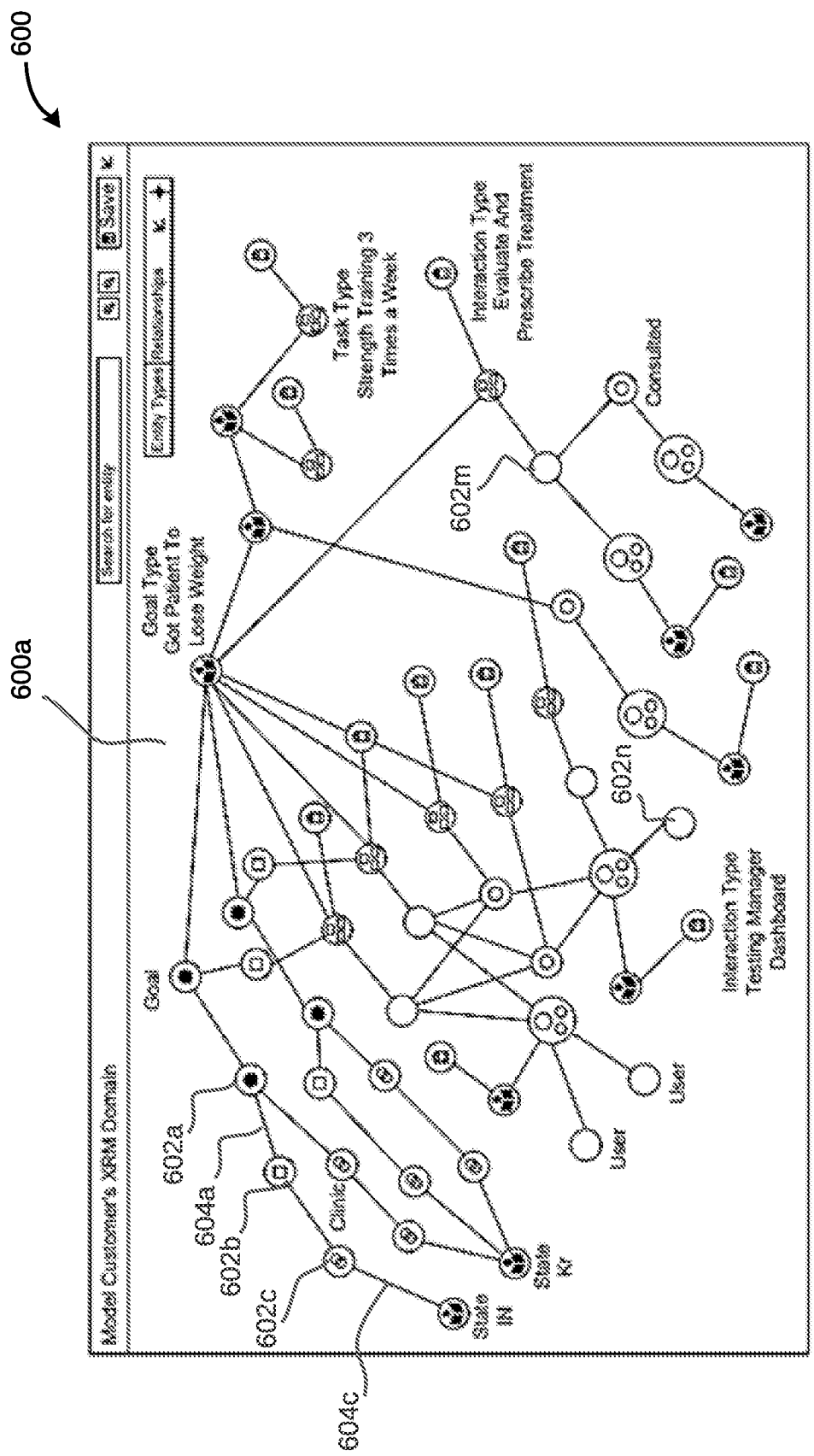
FIG. 6 illustrates a user interface that shows the security and access control policy, in accordance with some embodiments of the present disclosure.

The multi-dimensional model (for example, the network model) created/updated employing the FIGS. 1-4 above, is shown in the FIG. 6

Referring now to FIG. 6, a user interface 600 that shows the security and access control policy, in accordance with an embodiment of the disclosure. The user interface 600 may include the network model 600a, which may further include a plurality of nodes 602 corresponding to a plurality of entities, which are interconnected via interconnection network links 604 or based on interconnection networking inputs. For example, a node 602a and a node 602b may be interconnected via an interconnection network link 604a. Further, by way of an example, the network model 600a may include 'n' number of nodes including a node 602b, a node 602c, and a node 602n. Here, $n^{th}$ node may be the node 602n. Similarly, the network model 600a may include multiple numbers of interconnection network links (for example, (n−1) numbers of interconnection network links) to interconnect 'n' number of nodes. For example, the network model 600a may include an interconnection network link 604a, and an interconnection network link 604c.

In an embodiment, the plurality of nodes 602 represent any one of a user, a role type, a task type, a secondary task type, a goal type, a responsibility type, one or more task type for which a user is accountable, consulted or informed, and the interconnection network links 604 between the plurality of nodes 602 corresponding to the plurality of entities may represent connection between the plurality of nodes 602. In an embodiment, the attributes represented by the plurality of nodes 602 represent information related to the users, teams, goals, secondary goals, tasks, secondary tasks, and each of R-, A-, C-, and I-. Further, the interconnection network links 604 may represent information how, what and may be why each of the plurality of nodes 602 are connected with each other. Furthermore, a combination of the information/attributes represented by the plurality of nodes 602 and the interconnection network links 604 may provide information representing scope, for the user and/or teams, over the nodes or the entities including goals, secondary goals, tasks, secondary, and each of R-, A-, C-, and I- and/or the interconnection network links 604. The scope may apply a filtering mechanism over the information represented by the nodes and/or the interconnection networking inputs, hence narrowing them down.

In an embodiment, the scope may define inter-relationships between the nodes, and also defines a scope/coverage/area that a node may cover or include. For example, if a node represents a role type 'tester', which 'has' a responsibility type 'thyroid testing' and 'metabolism testing', and where the responsibility type 'thyroid testing' needs' a task type 'test thyroid function' to be executed. Thus, in such example, 'tester', 'thyroid testing', 'metabolism testing' and 'test thyroid function' are all nodes, while 'has' and 'needs' are the interconnection network links 604 between them, representing connections and/or limitations on the role type 'tester', associated with a user 'A', and the responsibility type 'thyroid testing'.

Hence, the scope for the role type 'tester' is being defined as the tester has responsibilities to do only 'thyroid testing' and 'metabolism testing', and for fulfilling 'thyroid testing', a 'test thyroid function' needs to be performed. Any other tests, if at all, fall under 'thyroid testing', are excluded from the scope of role/responsibility/task of the user 'A', because the user 'A' has to only perform the task of 'test thyroid function'. Such interconnections between the nodes are easily structured in the multi-dimensional model/network model 600a of the security and access control policies.

The scope may define one or more scoping attributes limiting goal, task, secondary tasks or process flow, responsibility, one or more tasks/goals for which a user is accountable, consulted or informed of a user or a team. In an embodiment, the scoping attributes act as a linking word or labels or data defining how, what, and why the nodes are connected to each other and what all information falls under scope of the nodes. Thus, these scoping attributes may margin or limit the scope of the plurality of nodes, and so, may provide a filtering mechanism for what all each node may include.

The disclosed system 100 may define the scoping at different levels. In an embodiment, the system 100 may define the scoping at a user level. In an embodiment, the system 100 may define the scoping at a team level. In an embodiment, the system 100 may define the scoping at a role level. In an embodiment, the system may define the scoping at a responsibility type level. In an embodiment, the system 100 may define the scoping at a task or sub-tasks type level. In an embodiment, the system 100 may define the scoping at accountability type level. In an embodiment, the system 100 may define the scoping at consultancy type level. In an embodiment, the system 100 may define the scoping at information type level. In an embodiment, the system 100 may define the scoping at one or more aforementioned levels as described, in any combination.

For example, when the system 100 defines the scoping at a team level, the scope is defined for each user in that team. Further in this embodiment for defining scoping for the team, scoping may be defined for roles, responsibilities, tasks, secondary tasks, one or more tasks/goals for which a user is accountable, consulted or informed of all the users in the team.

In an embodiment, a team may further include a plurality of secondary teams, for which scoping may be defined, either individually or same for one or more the secondary teams. In an embodiment, a team may further include a plurality of users, for which scoping may be defined, either individually or same for one or more the users. In an embodiment, a team may further include one or more organizations, and one or more users under those organizations, and the scoping may be defined either individually or same for one or more of them in any combination.

In an embodiment, when a scope is defined for a user, a team, role, responsibility type, task or secondary tasks type, and for one or more tasks/goals for which a user is accountable, consulted or informed, this may mean that there is universal scope coverage for that level or node. In an embodiment, the system 100 is able to show results applying the scoping rules on the data, and provides security and access control to the users after applying the scoping rules on the data. Advantageously, in the present system 1 security and access control is granted at the task level, therefore, in an embodiment of the present system, when a user has security and access control of a particular task, the user is automatically granted access and security to control to all the underlying components of the software application for executing that task, for example the underlying components including such as individual connected screens, related database entities, related APIs, and the like of the software application/system, implementing a process flow, involved in that particular task. Thus, any low-level change, in a process flow of individually connected screens in the task, would not affect the security and access control policies because the user is given the access to the entire task. Accordingly, the user is automatically given access to any number of connected screens and process flows involved in performing that task. Further, the techniques provide easy to use and intuitive graphical interfaces (series of screens) capable of providing comprehensive views.

Additionally, such a connected model with nodes and connections in between, as provided by the present disclosure, is highly flexible to introduce new changes within the software application, underlying architecture of the software applications, and change in security and access control layers. For example, if a user of the software application has been expanded with roles, or tasks, or responsibilities, then a developer of the present connected model needs to do a small manipulation of adding a node or a connection in between, where the newly added node may represent a new task, and the newly added connection of the new task with the user may represent the scope defining attributes which confine that task for the user. And further, the model may also easily connect the new introduced node or connection to the nodes and connections in the already laid connected model.

By adding more nodes and/or connections in the connected model disclosed herein, the present disclosure may define the tasks for the users more appropriately, more narrowed, with defined and characterized structures.

In this manner, other nodes and connections are not disturbed. Also, because task level or task-driven access and security control is assigned to the user, changing/adding/deleting any node or connection for that task does not affect the task level access and security control, and it remains consistent with the task. Thus, the access and security control assigned to a task is not affected by manipulating one or more process flows, within the task, that includes the users, tasks, responsibilities, goals, interaction, and tasks/goals for which a user is accountable, consulted or informed represented by the nodes and connections between the nodes.

Further, for introducing frequent changes/updates in underlying security and access control layers in the software systems, there is no need to change access and security control at GUI screen levels, APIs, or database access in the present connected multi-dimensional model, rather a small manipulation/modelling within the connected multi-dimensional model, like adding or deleting a node, adding or deleting a connection within a task process flow, updates the access and security control for that entire task.

This connected multi-dimensional model defines the tasks with associated responsibilities to achieve a goal at much more integrated level. Further, the connected multi-dimensional model not only models the underlying security and access control layers based on being task-driven or at task level, but also integrates scoping rules of that particular task with the user. Thereby, providing much defined and structured access and security control layers. The present disclosure provides high level of sophisticated triangulation in the connected multi-dimensional model.

For example, in some situations, a user may have access control based on a task assigned to him, which means a functional access control. But further, an implementation of a scoping rule on that assigned task will provide a defined access and security control to the user. This connection between the task and the scoping rule is visually provided in the comprehensive connected multi-dimensional model.

A sophisticated triangulation of multiple nodes, representing goals, RACI, roles, tasks and/or scopes may be easily and quickly achievable, accessible and visible in the connected multi-dimensional model. Such sophisticated triangulation further helps in modelling of access and security control in the software applications.

Advantageously, the present disclosure provides task level access control that makes the security policies less brittle by allowing for frequent changes that may be needed at lower levels (APIs, Data etc.) for executing on a task without having to change the user access policies themselves.

Unified security and access control is provided that is integral to the business system and security policies that may be authored using intuitive graphical interfaces.

Single canvas is provided where RBAC and RACI assignments may be authored as well as viewed with ease for comprehensive view of the security policy.

Converged security and business information and data models, in the present connected multi-dimensional model, provides support to complex security scoping policies as well as ease of implementation and speed of execution of the same.

The present system and method also provide the security administrators an ability to easily specify the scoping rules as well as ability to have the policies applied at run time in applications being secured in the present system.

Further, the present system and method provide graphical interfaces (series of screens) which are easy to use, very intuitive, provide comprehensive and connected views, and which are used to define, describe, document and maintain the security policies It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of providing security and access control in a network model, the method comprising:
   generating the network model for modelling security and access control layers of a software application, wherein the network model comprises comprising a plurality of process entities,
      wherein each of the plurality of process entities is one of a goal-type entity, an interaction-type entity, a process-type entity, a responsibility-type entity, a role-type entity, a task-type entity, and a team-type entity,
      wherein each of the plurality of process entities is represented by a corresponding node on a node-based User-Interface, and
      wherein each of a plurality of nodes corresponding to the plurality of entities is configured to be linked with at least one of remaining nodes of the plurality of nodes in the node-based User-Interface, via an interconnection network link;
   receiving one or more attributes associated with each of the plurality of nodes;
   dynamically assigning a scope to each of the plurality of nodes corresponding to the plurality of entities based on the one or more attributes associated with each of the plurality of nodes and the interconnection network link between the plurality of nodes,
      wherein the scope is to limit access to an associated node of the plurality of nodes for one or more entities corresponding to one or more nodes linked to the associated node, and
   creating a dynamic, multi-dimensional, and task-driven access control policy for a target node of the plurality of nodes based on the scope, wherein the dynamic, multi-dimensional, and task-driven access control policy is configured to allow at least one designated user to access the target node,
      wherein the user is designated based on the scoping and at least one of a role-data, a responsibility-data, an accountable-data, a consulted-data, or an informed-data associated with the user, wherein accessing the target node comprises at least one of:

viewing at least one of the one or more attributes associated with the target node;
modifying at least one of the one or more attributes associated with the target node; or
modifying an interconnection network link between the target node and another node of the plurality of nodes.

2. The method of claim 1, wherein the one or more attributes comprise at least one of: a type of goal associated with the entity, a type of interaction associated with the entity, a type of process associated with the entity, a type of responsibility associated with the entity, a type of role associated with the entity, a type of task associated with the entity, and a type of team associated with the entity.

3. The method of claim 1, wherein modifying the attributes associated with the target node comprises at least one of:
modifying the interconnection network link between the target node and an interconnected node to which the target is interconnected; or
modifying the attributes associated with the interconnected node.

4. The method of claim 1, wherein modifying the interconnection network link between the target node and another node of the plurality of nodes comprises:
modifying the attributes associated with the interconnected node.

5. The method of claim 1, wherein the access control policy is created by an administrator-designated user.

6. The method of claim 1, further comprising:
receiving an access request from a user for accessing the target node;
fetching a user profile of the user, wherein the user profile comprises: the role-data, the responsibility-data, the accountable-data, the consulted-data, or the informed-data associated with the user;
mapping the user profile with the one or more attributes associated with the target node; and
allowing access to the user for accessing the target node based on the mapping.

7. The method of claim 1, wherein the task-driven access control policy is configured to allow at least one designated user to access one or more graphical user screen interfaces of the software application,
wherein the one or more graphical user screen interfaces are communicatively coupled to at least one database to retrieve data associated with the target node.

8. The method of claim 1, wherein the scope applies a filtering mechanism on each of the plurality of nodes corresponding to a reach and inclusivity of the node.

9. A system for providing security and access control in a network model, the system comprising:
a processor; and
a memory communicatively coupled to the processor, wherein the memory stores processor-executable instructions, which, on execution, cause the processor to:
generate the network model for modelling security and access control layers of a software application, wherein the network model comprises a plurality of process entities,
wherein each of the plurality of process entities is one of a goal-type entity, an interaction-type entity, a process-type entity, a responsibility-type entity, a role-type entity, a task-type entity, and a team-type entity,
wherein each of the plurality of process entities is represented by a corresponding node on a node-based User-Interface, and
wherein each of a plurality of nodes corresponding to the plurality of entities is configured to be linked with at least one of remaining nodes of the plurality of nodes in the node-based User-Interface, via an interconnection network link;
receive one or more attributes associated with each of the plurality of nodes;
dynamically assign a scope to each of the plurality of nodes corresponding to the plurality of entities based on the one or more attributes associated with each of the plurality of nodes and the interconnection network link between the plurality of nodes,
wherein the scope is to limit access to an associated node of the plurality of nodes for one or more entities corresponding to one or more nodes linked to the associated node, and
create a dynamic, multi-dimensional, and task-driven access control policy for a target node of the plurality of nodes based on the scope, wherein the dynamic, multi-dimensional, and task-driven access control policy is configured to allow at least one designated user to access the target node,
wherein the user is designated based on the scoping and at least one of a role-data, a responsibility-data, an accountable-data, a consulted-data, or an informed-data associated with the user, wherein accessing the target node comprises at least one of:
viewing at least one of the one or more attributes associated with the target node;
modifying at least one of the one or more attributes associated with the target node; or
modifying an interconnection network link between the target node and another node of the plurality of nodes.

10. The system of claim 9, wherein the one or more attributes comprise at least one of: a type of goal associated with the entity, a type of interaction associated with the entity, a type of process associated with the entity, a type of responsibility associated with the entity, a type of role associated with the entity, a type of task associated with the entity, and a type of team associated with the entity.

11. The system of claim 9, wherein the processor-executable instructions further cause the processor to modify the attributes associated with the target node by at least one of:
modifying the interconnection network link between the target node and an interconnected node to which the target is interconnected; or
modifying the attributes associated with the interconnected node.

12. The system of claim 9, wherein the processor-executable instructions further cause the processor to modify the interconnection network link between the target node and another node of the plurality of nodes by modifying the attributes associated with the interconnected node.

13. The system of claim 9, wherein the access control policy is created by an administrator-designated user.

14. The system of claim 9, wherein the processor-executable instructions further cause the processor to:
receive an access request from a user for accessing the target node;
fetch a user profile of the user, wherein the user profile comprises: the role-data, the responsibility-data, the accountable-data, the consulted-data, or the informed-data associated with the user;

map the user profile with the one or more attributes associated with the target node; and allow access to the user for accessing the target node based on the mapping.

15. A non-transitory computer-readable medium storing computer-executable instructions for providing security and access control in a network model, the computer-executable instructions configured for:

generating the network model for modelling security and access control layers of a software application, wherein the network model comprises comprising a plurality of process entities,
- wherein each of the plurality of process entities is one of a goal-type entity, an interaction-type entity, a process-type entity, a responsibility-type entity, a role-type entity, a task-type entity, and a team-type entity,
- wherein each of the plurality of process entities is represented by a corresponding node on a node-based User-Interface, and
- wherein each of a plurality of nodes corresponding to the plurality of entities is configured to be linked with at least one of remaining nodes of the plurality of nodes in the node-based User-Interface, via an interconnection network link;

receiving one or more attributes associated with each of the plurality of nodes;

dynamically assigning a scope to each of the plurality of nodes corresponding to the plurality of entities based on the one or more attributes associated with each of the plurality of nodes and the interconnection network link between the plurality of nodes,
- wherein the scope is to limit access to an associated node of the plurality of nodes for one or more entities corresponding to one or more nodes linked to the associated node, and creating a dynamic, multi-dimensional, and task-driven access control policy for a target node of the plurality of nodes based on the scope, wherein the dynamic, multi-dimensional, and task-driven access control policy is configured to allow at least one designated user to access the target node,
- wherein the user is designated based on the scoping and at least one of a role-data, a responsibility-data, an accountable-data, a consulted-data, or an informed-data associated with the user, wherein accessing the target node comprises at least one of:
  - viewing at least one of the one or more attributes associated with the target node;
  - modifying at least one of the one or more attributes associated with the target node; or
  - modifying an interconnection network link between the target node and another node of the plurality of nodes.

16. The non-transitory computer-readable medium of the claim 15, wherein the one or more attributes comprise at least one of: a type of goal associated with the entity, a type of interaction associated with the entity, a type of process associated with the entity, a type of responsibility associated with the entity, a type of role associated with the entity, a type of task associated with the entity, and a type of team associated with the entity.

17. The non-transitory computer-readable medium of the claim 15, wherein the computer-executable instructions further configured for modifying the attributes associated with the target node by at least one of:
- modifying the interconnection network link between the target node and an interconnected node to which the target is interconnected; or
- modifying the attributes associated with the interconnected node.

18. The non-transitory computer-readable medium of the claim 15, wherein the computer-executable instructions further configured for modifying the interconnection network link between the target node and another node of the plurality of nodes by modifying the attributes associated with the interconnected node.

19. The non-transitory computer-readable medium of the claim 15, wherein the access control policy is created by an administrator-designated user.

20. The non-transitory computer-readable medium of the claim 15, wherein the computer-executable instructions further configured for receiving an access request from a user for accessing the target node;
- fetching a user profile of the user, wherein the user profile comprises: the role-data, the responsibility-data, the accountable-data, the consulted-data, or the informed-data associated with the user;
- mapping the user profile with the one or more attributes associated with the target node; and
- allowing access to the user for accessing the target node based on the mapping.

* * * * *